United States Patent [19]

Brenner et al.

[11] 4,161,304

[45] Jul. 17, 1979

[54] RUBBER ELASTIC ENGINE MOUNTS OR SUPPORTS WITH HYDRAULIC DAMPING, ESPECIALLY FOR ENGINE SUSPENSIONS IN MOTOR VEHICLES

[75] Inventors: Heinz Brenner; Arno Hamaekers, both of Ahrweiler, Fed. Rep. of Germany

[73] Assignee: BOGE GmbH, Eitorf, Fed. Rep. of Germany

[21] Appl. No.: 791,309

[22] Filed: Apr. 27, 1977

[30] Foreign Application Priority Data

Apr. 27, 1976 [DE] Fed. Rep. of Germany ....... 2618333
Oct. 19, 1976 [DE] Fed. Rep. of Germany ....... 2647105
Oct. 27, 1976 [DE] Fed. Rep. of Germany ....... 2648526

[51] Int. Cl.² .................................................. F16F 15/04
[52] U.S. Cl. ..................................... 248/562; 267/35; 267/152
[58] Field of Search ........................ 267/35, 137, 152; 248/9, 10, 15, 18, 22, 358 R

[56] References Cited

U.S. PATENT DOCUMENTS

| | | | |
|---|---|---|---|
| 2,387,066 | 10/1945 | Harding | 248/22 X |
| 2,417,096 | 3/1947 | Thiry | 248/10 X |
| 2,437,206 | 3/1948 | Neher | 248/358 R |
| 2,582,998 | 1/1952 | Lee | 248/358 R |
| 3,070,363 | 12/1962 | Ellis, Jr. | 267/35 X |
| 3,322,377 | 5/1967 | Morlon | 248/10 |
| 3,782,769 | 1/1974 | Fader et al. | 188/314 X |

FOREIGN PATENT DOCUMENTS

| | | | |
|---|---|---|---|
| 1260886 | 2/1968 | Fed. Rep. of Germany | 267/35 |
| 1931940 | 2/1971 | Fed. Rep. of Germany | 248/10 |
| 896762 | 5/1962 | United Kingdom | 248/10 |

*Primary Examiner*—George E. A. Halvosa
*Attorney, Agent, or Firm*—Larson, Taylor and Hinds

[57] ABSTRACT

A rubber elastic engine mount with hydraulic damping, especially for motor vehicles, includes an elastic peripheral wall on the engine side joined with a metallic end wall that can be connected with an engine casing, and joined also with a metallic supporting element that can be connected to an engine supporting frame. The elastic wall together with the end walls forms a liquid-filled main chamber which is closed off by a partition connected with the supporting element, and which is connected with an auxiliary liquid-filled elastic walled chamber on the other side of the partition. The auxiliary chamber may be constructed generally the same as the main chamber, including an elastic peripheral wall joined with the supporting element and with a metallic end wall relatively away from the engine. The two end walls are rigidly connected. The peripheral walls function as thrust springs. The partition may be rigid and stationary, or it may be movable. A foamed material may be disposed in the chambers so as to accommodate low amplitude oscillations without any appreciable hydraulic damping. One or both of the end walls may be double-walled, including an outer fixed wall and an inner diaphragm-like yieldable wall, the inner wall being constructed with a predetermined yieldability so as to accommodate high frequency oscillations of low amplitude without any appreciable hydraulic damping.

15 Claims, 7 Drawing Figures

RUBBER ELASTIC ENGINE MOUNTS OR SUPPORTS WITH HYDRAULIC DAMPING, ESPECIALLY FOR ENGINE SUSPENSIONS IN MOTOR VEHICLES

FIELD OF THE INVENTION

This invention relates to rubber or elastic engine mounts or supports with hydraulic damping, especially for supporting or mounting engines in motor vehicles so as to vibrationally insulate the vehicle frame from the engine.

BACKGROUND AND SUMMARY OF THE INVENTION

In engine mounts of this kind, the spring characteristics of an engine suspension can be optimally designed by appropriate configuration of the engine mounts and selection of the rubber quality, and also the damping inherent in the hysteresis of the rubber elastic peripheral walls can be supplemented by suitable design of the hydraulic damping, so that there are optimal conditions with respect to oscillation damping of the engine suspension also. In this way the requirement of motor vehicle construction is met, that it be possible strongly to damp lower frequency high amplitude oscillations of the engine casing, and allow high frequency oscillations with low amplitude, e.g. 0.1 mm, of the engine casing to pass undamped as much as possible.

From German Pat. No. 945,899, there is known a liquid hollow spring device with intrinsic damping, the device presenting a main chamber and an extension chamber, filled with a flow agent and connected via ports in a partition that serves as a supporting wall or element, with the main chamber consisting of a hollow spring element of rubber elastic material and the extension chamber being defined by a rubber elastic diaphragm. In this known arrangement the extension chamber only performs the task of receiving liquid forced from the main chamber and returning it thereto, such that the elastic deformation of the diaphragm contributes only slightly to the spring. It is a disadvantage that the space required for the extension chamber is not exploitable for the main function of the engine mount, namely the spring function.

A basic problem to which the instant invention is directed is to make use of an auxiliary chamber, somewhat analogous to that which accommodates the extension chamber of such known hollow springs, for a spring function. Thus, the space that accommodates the auxiliary chamber is used not only for the damping function by receiving and restoring fluid from and to the main chamber, but also advantageously for the spring function. In engine mounts in accordance with the invention, advantageously peripheral walls made as thrust springs are adheringly joined, for example by vulcanizing, with external conical surfaces of the supporting element or carried by the supporting element, and are joined also with internal conical surfaces of end walls of the device, or vice versa with inner conical surfaces of the supporting element or carried by the supporting element and external conical surfaces of the end walls, or there are combinations of these possibilities. If there are external conical surfaces of the supporting element and inner conical surfaces of the end walls, it is simple to use a unitary vulcanized rubber-metallic part. If there are internal conical surfaces of the supporting element and external conical surfaces of the end walls, the engine mount is advantageously made of two opposedly stressed rubber-metallic parts with a partition held between them. The connection of the end walls can be effected by means of a pin that passes through them and intermediate spacing tubes, whereby these parts pass through the partition. In this way a gap formed between a center hole of a partition and a spacing tube can function as a choke opening between auxiliary and main chambers separated by the partition. This gap can be made as a laminar gap by connection of the partition with a sheath, and its choke resistance can be adapted to different conditions by changing the diameter of the spacing tube.

The partition can be rigid, or it may be made as a rubber elastic partition, and it can be adheringly connected to the supporting element and a sheath which, together with a connecting pin, constitutes a choke gap. In this way the sheath can be movable with respect to the supporting element, and, for example, it can be immovable, by stressing it between spacing tubes. A rubber elastic partition can act as a thrust spring in the limited stroke-end zone of an end wall and be integral with a peripheral wall.

Because of the rigid connection of the two end walls of the device, the axial spring paths of the end walls with reference to the supporting element are equal to each other. The changes of volume of the main and auxiliary chambers that are caused by a specific spring path with balanced liquid pressure in the main and auxiliary chambers can be like or different, from suitable configuration of the peripheral walls and possibly of an elastic partition. If a decrease in volume of the main chamber is greater than the volume increase in the auxiliary chamber, the balanced liquid pressure moves outward with corresponding bulging of the peripheral walls. If a volume increase of the main chamber is greater than the volume decrease in the auxiliary chamber, the balanced liquid pressure drops with a corresponding inward contraction of the peripheral walls, whereby a vacuum can develop and cavities will form. Such cavities, or cavities intentionally produced, e.g. by incomplete filling, can serve in an engine mount strongly to damp low frequency oscillations with great amplitude and to allow high frequency low amplitude oscillations to pass, without exchange of liquid between the main and auxiliary chambers, hence without liquid damping. The same effect can be managed also with a readily movable partition whose stroke is narrowly limited. Inside the chambers there can be cavities closed off from the liquid by a diaphragm or diaphragms, the cavities being filled with gas at a selected pressure, or preferably vented to the outside. Pressurized liquid can be charged into the chambers in order to expand the peripheral walls from the beginning and to prevent production of a vacuum, if this is not wanted.

In one embodiment of an engine mount (to be hereafter described and shown) in accordance with the invention, a rubber elastic partition is adheringly joined with an internal surface of a supporting element and an external surface of a sheath which at the same time is adheringly joined with the end wall that is away from the engine. The sheath, along with a spacing tube associated with the rigid connection of the end walls, forms an annular choke gap whose form and size determine the magnitude of the hydraulic damping forces. In transverse movements that exceed the width of the choke gap, of an engine borne by the engine mount, there is the possible drawback of hard impact of the sheath on the spacing tube, and the radial rigidity of the engine mount is substantial. The engine mount of a further embodiment avoids these drawbacks in that a rubber elastic partition that is adheringly joined with a surface of the supporting element presents a collar at the end of a neck, which collar, together with a bolt that connects the two end walls or with a spacing tube held by the bolt, forms an annular gap which serves as a choke opening. The collar seated on the end of the neck advantageously imposes a relatively slight resistance to transverse movements, whereby the engine mount has less transverse rigidity, which can be effected to a desired degree by suitable configuration of the neck and collar.

With balanced fluid pressure in the main and auxiliary chambers, the changes in volume of the main and auxiliary chambers caused by a specific spring path of the engine mount may be equal to each other or different. If there are differences in volume, these can be balanced in an engine mount of the last mentioned embodiment by axial relative movements of the collar, where the collar and the neck are given suitable elastic resilience in an axial direction. Such axial resilience can likewise serve to accept high frequency oscillations with low amplitudes without any appreciable exchange of liquid between the main chamber and the auxiliary chamber, hence without any appreciable hydraulic damping. Oscillations with low amplitudes may also be accommodated by foamed structures in the main and/or auxiliary chambers, preferably disposed on the chamber walls, without occurrence of hydraulic damping, or not in any degree worth mentioning.

The invention also relates to hydraulically damped rubber elastic engine mounts designed for cutout of the hydraulic damping in case of high frequency oscillations. As previously mentioned, in use of engine mounts of this kind for automotive vehicle engines, it is desirable that low frequency high amplitude oscillations of the engine be strongly damped, and that high frequency, particularly acoustic, oscillations with minimal amplitudes be allowed to pass without liquid damping. In one embodiment it is proposed by way of example that hollow chambers closed off by diaphragms be provided for this purpose, the chambers being filled with gas or vented to the outside. The proposed chambers must impose a relatively high defined resistance to a forcing of the diaphragms, and they must be small, in order that even with low amplitudes of vibration of the motor mounting the pressure needed for hydraulic damping can build-up in the liquid chambers.

If for the purpose of fast build-up of pressure a chamber filled with gas at high pressure is provided, there is danger of a diffusion of the gas through the diaphragm into the liquid chambers, with loss or pressure in the gas chambers, and the resistance of the gas chambers against forcing in of the diaphragms will drop in a short time to undefined levels, and the characteristics of the hydraulic damping forces will be harmfully affected.

A further embodiment of the instant invention is addressed to the problem of further development of the engine mounting in accordance with the invention by a construction where high frequency oscillations of minimal amplitude will be effectively passed with operational reliability and cutting out of hydraulic damping. This problem is solved by providing a construction wherein one or more of the end walls present, in a double-wall arrangement, an outer fixed wall and an inner diaphragm-like yielding wall which is sealed off with reference to the outer end wall, the inner wall being fixed by means of rubber elastic edges to the outer wall and bearing on the outer wall by means of elastic projections through whose deformation resistance the yielding of the inner wall is defined. Preferably the intermediate space defined by the outer and inner walls presents venting ports that lead to the outside.

Thus advantageously in the liquid chambers there is a steady uniform build-up of the pressure needed for hydraulic damping in the case of greater amplitudes, because the yielding of the inner wall is precisely defined by the mechanical elasticity of the rubber elastic projections. On the other hand, the yielding of the inner wall, with suitable dimensioning, cuts out the hydraulic damping in case of high frequency oscillations of minimal amplitude, of the order of magnitude of a few tenths of a millimeter.

The outer wall of a double-walled end wall is advantageously provided with a depression that has conical transition surfaces, and the inner wall is made as a vulcanized rubber-metallic part consisting essentially of a metallic plate and a surrounding rubber edge, whereby the rubber edge is fixed to the outer wall and presents projections that are applied to the mentioned conical transition surfaces and deformed when the inner wall approaches the outer wall, with increasing resistance up to a blocking of the movement of the inner wall.

In the stroke-limited end position that is thus brought about, the inner wall can be thought as a fixed wall, and with great amplitudes the specified pressure in a liquid chamber for the stroke velocity of the end walls with respect to the supporting element can be developed to the full. In an engine mount whose liquid chambers have a connecting bolt passing through them to connect the end walls, the inner wall of a double walled end wall is advantageously made as a rubber-metallic part consisting of a metallic annular plate and rubber rings adheringly joined thereto on the inner and outer peripheries, with the bolt passing through. The chamber formed by the inner and outer walls of a double-walled end wall can be filled with gas at pressure high enough so that a change of pressure, e.g. by diffusion of the gas into the liquid chambers, will have no disturbing effect on the course of the hydraulic damping forces. Advantageously, the intermediate space will be vented to the outside, to produce a specific pressure in it.

Examples of embodiments of engine mounts according to the invention are shown in the appended drawings.

DESCRIPTION OF THE PREFERRED EMBODIMENTS

Figure 1:
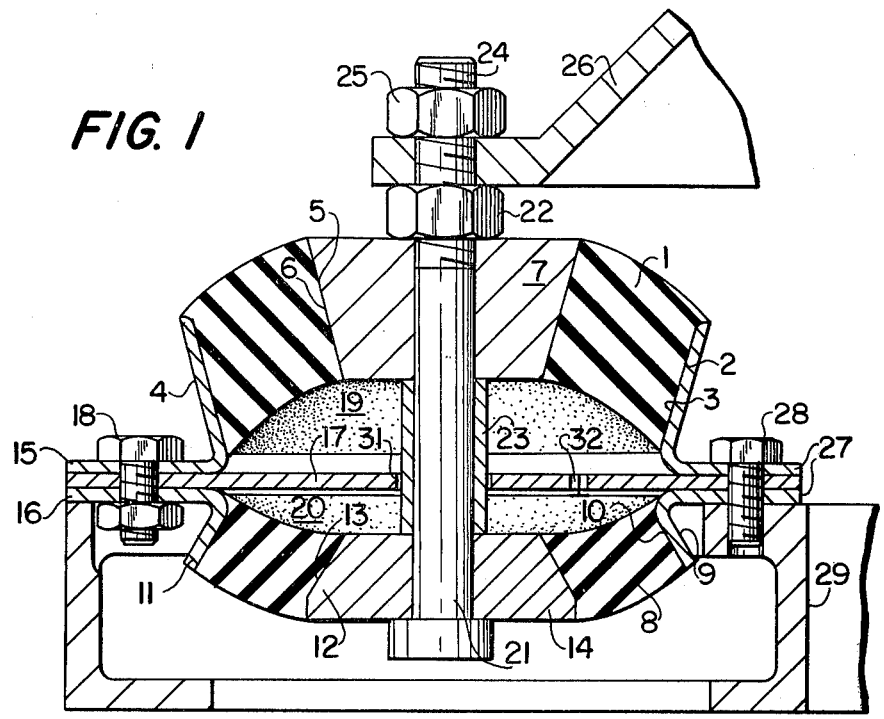
FIG. 1 shows, in partial section, an engine mount with peripheral walls acting as thrust springs, and with a rigid partition.

In an engine mount as in FIG. 1, a rubber elastic peripheral wall 1 on the engine side is adheringly joined on its outer periphery 2 with an internal conical surface 3 of a sheet housing 4 that includes a flange 15, and on the inner periphery 5 with an external conical surface 6 of an end wall 7 on the engine side. A rubber elastic peripheral wall 8 relatively away from the engine is adheringly joined on outer periphery 9 with an internal conical surface 10 of a sheet casing 11 that includes a flange 16, and on the inner periphery 12 with an external conical surface 13 of an end wall 14 that is relatively away from the engine. On the engine side, a partition 17 held by bolts 18 tightly between flanges 15 and 16 closes off a main chamber 19 formed by end wall 7 and peripheral wall 1, and on the side away from the engine said partition 17 closes off an auxiliary chamber 20 formed by end wall 14 and peripheral wall 8. Flanges 15 and 16 may be considered as constituting a support element 27. A penetrating bolt 21 stresses end wall 14, spacing tube 23, and end wall 7 by means of a nut 22, and thus rigidly connects the two end walls 7 and 14. Wall 7 on the engine side is connected by an extension 24 of bolt 21 and a nut 25 with an engine casing or mounting brackets schematically indicated at 26.

Support element 27 is connected by bolts 28 with an engine supporting frame 29. Partition 17 is penetrated with clearance by spacing tube 23, and forms an open gap 31 with spacing tube 23. Main chamber 19 and auxiliary chamber 20 are filled with damping liquid advantageously comprising fifty per cent water and fifty per cent glycol when, for example, the engine mount is assembled below the liquid level of a receptacle filled with damping liquid.

Upon oscillations of engine casing 26 in the longitudinal direction of bolt 21, the dynamic engine bearing forces will be accommodated by elastic yielding of peripheral walls 1 and 8, whereby the respective volumes of main chamber 19 and auxiliary chamber 20 will change, corresponding amounts of liquid will be forced through gap 31, and hydraulic damping forces will be produced. The damping force characteristic can be controlled as a function of stroke and frequency, not only by means of gap 31 but also by an optional valved opening 32.

Figure 2:
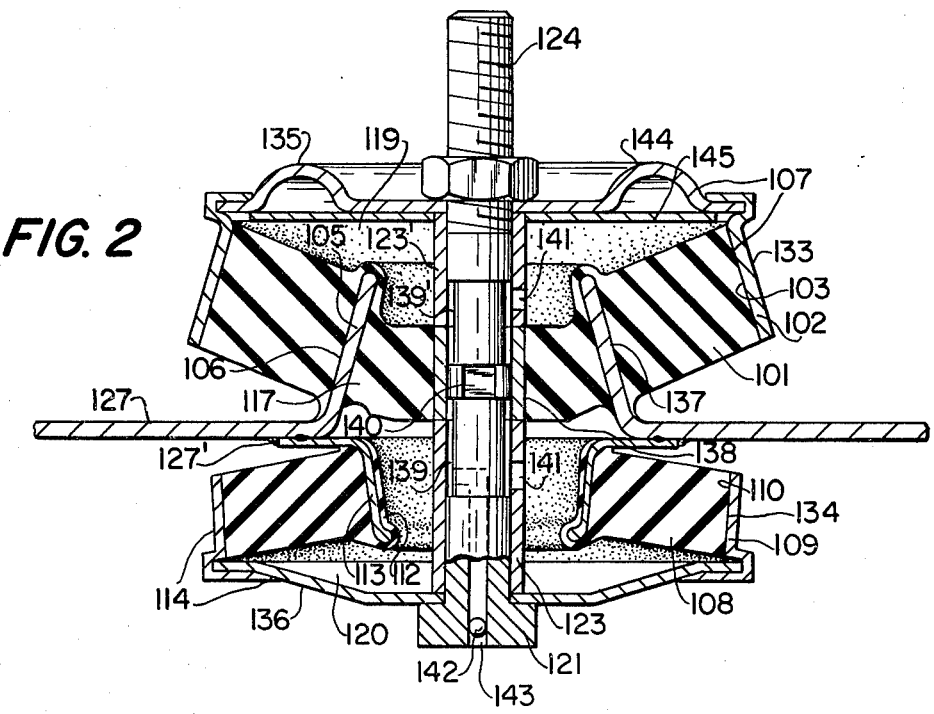
FIG. 2 shows in partial section an engine mount with peripheral walls acting as thrust springs, and with a rubber elastic partition.

In the engine mount of FIG. 2, a rubber elastic peripheral wall 101 on the engine side is adheringly joined on outer periphery 102 with an internal conical surface 103 of a sheet ring 133 on the engine side, and on inner periphery 105 it is adheringly joined with an outer conical surface 106 of a supporting element 127 on the engine side. A rubber elastic peripheral wall 108 that is away from the engine is adheringly joined on outer periphery 109 with an internal conical surface 110 of a sheet ring 134, and on the inner periphery 112 it is adheringly joined with outer conical surface 113 of a welded-on sheet part 127' of supporting element 127. A rubber elastic partition 117 is adheringly joined with an internal surface 137 of supporting element 127 and to the outer surface of a sheath 138. On the engine side, partition 117 closes off a main chamber 119 formed by a sheet cap 135 that is sealingly connected to ring 133 by means of a flange, and by peripheral wall 101. On the other side, partition 117 closes off an auxiliary chamber 120 which is formed by a cap 136 also joined with ring 134, and by peripheral wall 108. Sheet rings 133 and 134 together with caps 135 and 136 form the end walls 107 and 114, analogous to end walls 7 and 14 of the FIG. 1 embodiment.

A penetrating bolt 121 connects end wall 114, a spacing tube 123, sheath 138, a spacing tube 123' and end wall 107, and peripheral grooves 139 and 139' and connecting longitudinal groove or grooves 140 of bolt 21 together with openings 141 and 141' in spacing tubes 123 and 123' form connecting passages that act as a choke opening between main chamber 119 and auxiliary chamber 120, the configuration and size of which connecting passages determine the hydraulic damping of the engine mount. Bolt 121 is provided with a threaded portion 124 on the engine side. In bolt 121 there is a charging bore 143 closed by a pressed in ball 142, through which bore the liquid can be charged with or without excess pressure as compared to ambient pressure. A closable air evacuation port that is not illustrated can be provided at a suitable location. In main chamber 119 there is a cavity 144 equipped with a diaphragm 145, which can be used for gas charging.

Figure 3:
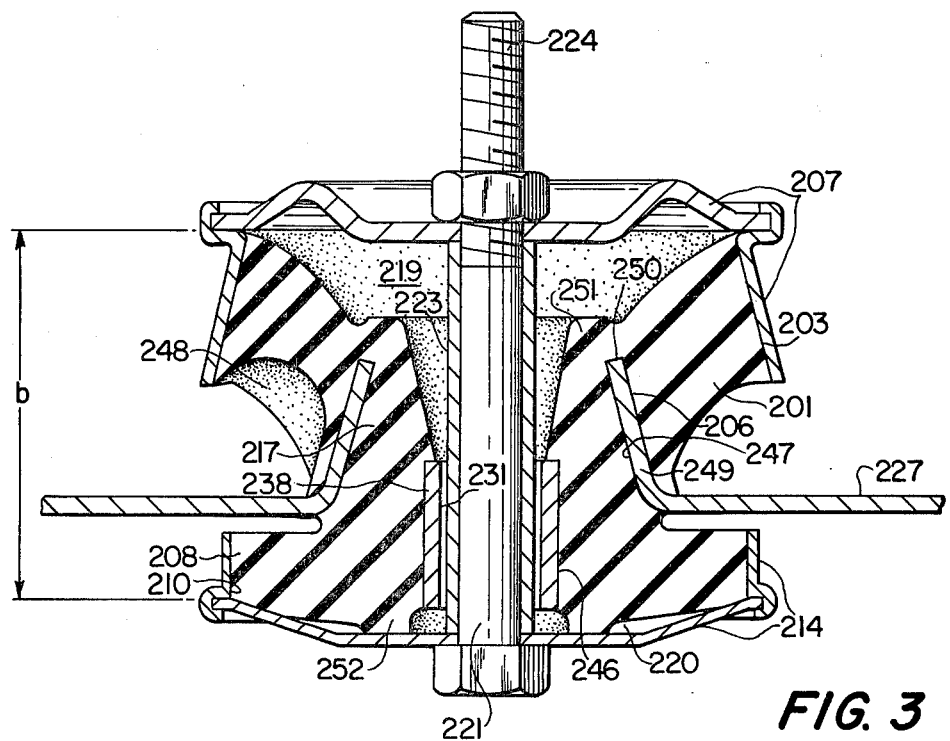
FIG. 3 shows in partial section an engine mount with a rubber elastic partition that is integral with a peripheral wall that is relatively away from the engine.

In the engine mount of FIG. 3, a peripheral rubber elastic wall 201 on the engine side is adheringly joined with an inner conical surface 203 of an end wall 207 on the engine side, and also with an external surface 206 of a sheet ring 249 of a supporting element 227. A rubber elastic peripheral wall 208 away from the engine is adheringly joined with an internal conical surface 210 of an end wall 214 that is away from the engine, and with an external surface 246 of a sheath 238. A rubber elastic partition 217 that is integral with peripheral wall 208 is also adheringly joined with the external surface 246 of sheath 238 and with an internal conical surface 247 of supporting element 227 on the engine side. Between wall 207, peripheral wall 201 and partition 217, there is formed a main chamber 219. An auxiliary chamber 220 is formed between wall 214 and peripheral wall 208. A penetrating bolt 221 connects wall 214, a spacing tube 223, and wall 207. Spacing tube 223, with sheath 238, forms a choke gap 231 whose configuration and dimensions essentially determine the magnitude of the hydraulic damping forces. The engine mount is illustrated when not under load. When it is installed, the weight of the engine produces a stroke, with reduction of the distance between end wall 207 and supporting element 227. From this imagined static rest position, the engine mount has a free stroke in either direction — in one direction until wall 207 strikes against a rubber pad 251, and in the other direction until wall 214 strikes against a rubber pad 252. Rubber 251 is built onto wall 250 of sheet ring 249, and because of a relatively small rubber volume therebetween it causes a relatively hard impact on wall 207. Rubber pad 252 has sheath 238 in the zone away from the engine and is so located and configured as to cause a soft impact on wall 214, whereby in this direction of impact partition 217 acts like a thrust spring.

Figure 4:
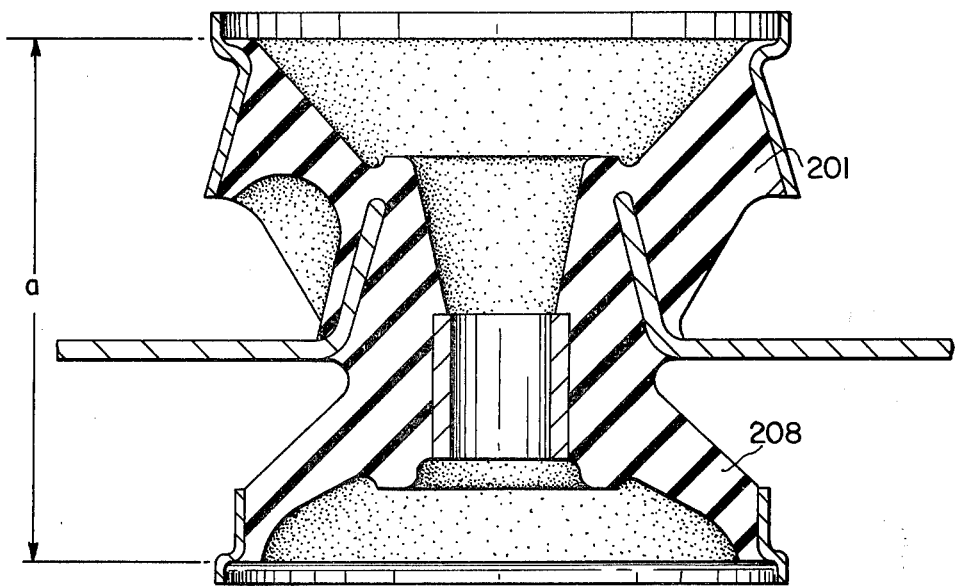
FIG. 4 shows the vulcanized rubber-metallic part of the engine mount of FIG. 3, before assembly.

The rubber-metallic part of FIG. 4, shown before assembling, has an axial length a which is greater than the corresponding axial length b of the engine mount of FIG. 3 after assembling, so that peripheral wall 201 on the engine side and peripheral wall 208 away from the engine have mutually opposed biassing after assembly.

The magnitude of this biassing is given by the length of spacing tube 223, and is adaptable to actual conditions, whereby there is the possibility that the spring characteristic of the assembled engine mount can be laid in favorable zones of the known individual characteristics of walls 201 and 208, which characteristics are not in proportion.

The engine mount of the invention can be made in such a way that it will allow necessary transverse movements and elastically absorb the shock. In an engine mount as in FIG. 1, transverse movements are limited by metallic impact of spacing tube 23 on partition wall 17, and the magnitude is determined by the width of gap 31. In a mount as in FIG. 2, transverse motions are possible without metallic impact of any part whatsoever. In transverse movements of an engine mount as in FIG. 3, which exceed the width of gap 231, there is shock absorbing impact of spacing tube 223 on sheath 238, but the noise of the impact can be damped by a rubber skin vulcanized onto the internal surface of sheath 238. In an engine mount as in FIG. 3, peripheral wall 201 includes hollowed pockets 248 that allow different characteristics for transverse shock absorption, depending upon the direction of the transverse movement.

The invention in accordance with the embodiments of FIGS. 1-4 is not limited to the disposition of the walls on the engine side and on the side away from the engine, with reference to the engine casing, and the disposition of the supporting element with reference to the engine frame. These arrangements may be different. The main and auxiliary chambers may be made as mirror images of each other, without exceeding the scope of the invention.

The engine mounts may also be utilized in transmissions between rotary power and operating machinery, where a plurality of engine mounts distributed on the coupling segment can transmit peripheral forces and hydraulically damp rotational oscillations.

Figure 5:
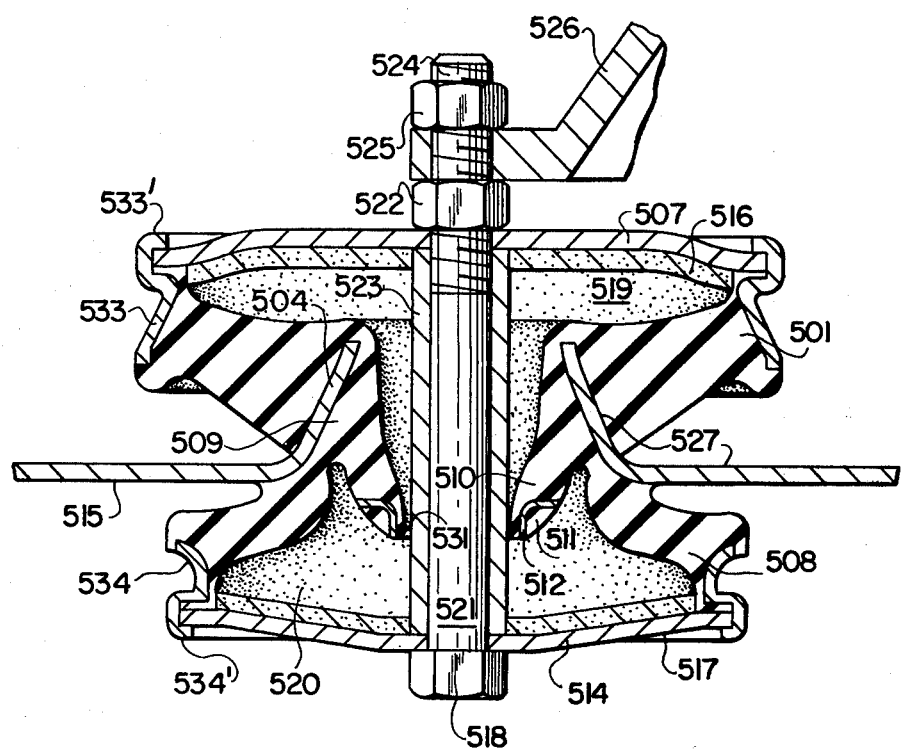
FIG. 5 shows a further embodiment of an engine mount related to the embodiment of FIG. 3, avoiding some of the drawbacks of the FIG. 3 embodiment as previously discussed.

FIG. 5 shows a further embodiment of an engine mount according to the invention, related to the embodiment of FIG. 3. An elastic peripheral wall 501 on the engine side is adheringly joined at its outer periphery with a sheet ring 533 and on its inner periphery with a conical surface 504. Sheet ring 533 is fixed by means of a flange 533' to an end wall 507 on the engine side. Conical surface 504 and a flange 515 that is integral therewith constitutes a supporting element 527 which is to be considered as fixed to or fixable to a vehicle structure or engine supporting frame, in a way that need not be illustrated. A rubber elastic peripheral wall 508 on the side away from the engine is adheringly joined on its outer periphery with a sheet ring 534 and on its internal periphery, in the region of the transition of conical shell 504 into flange 515, with the said supporting element 527. Sheet ring 534 is fastened by means of a flange 534' to an end wall 514 on the side away from the engine.

A bolt 521 with a head 518 clamps wall 514, a spacing tube 523, and wall 507 by means of a nut 522, and thus rigidly connects the two walls 507 and 514 with each other. Wall 507 on the engine side is fixed by means of an extension 524 of bolt 521 and a nut 525 to an engine casing indicated by numeral 526. A rubber elastic partition 509 is adheringly joined at its outer periphery with the conical surface 504 of supporting element 527, and is provided with a neck 510 toward the side away from the engine, which neck ends in a collar 511 that is reinforced by an angle-shaped annular metallic insert 512. A main chamber 519 is formed by peripheral wall 501 and end wall 507 and closed off by partition 509, on the other side of which an auxiliary chamber 520 is defined by peripheral wall 508 and end wall 514. Main chamber 519 and auxiliary chamber 520 are filled with liquid and are interconnected via an annular gap 531 between collar 511 and spacing tube 523, which gap serves as a choke opening. Collar 511 imposes a relatively slight resistance to transverse motions relative to supporting element 527.

In the main chamber there is a plate-like structure 516 made of foamed material, and/or the end wall 507 toward the engine may be coated with foamed material. In the auxiliary chamber there is a plate-like structure 517 of foamed material, and/or the wall 514 away from the engine may be coated with foamed material.

Figure 6:
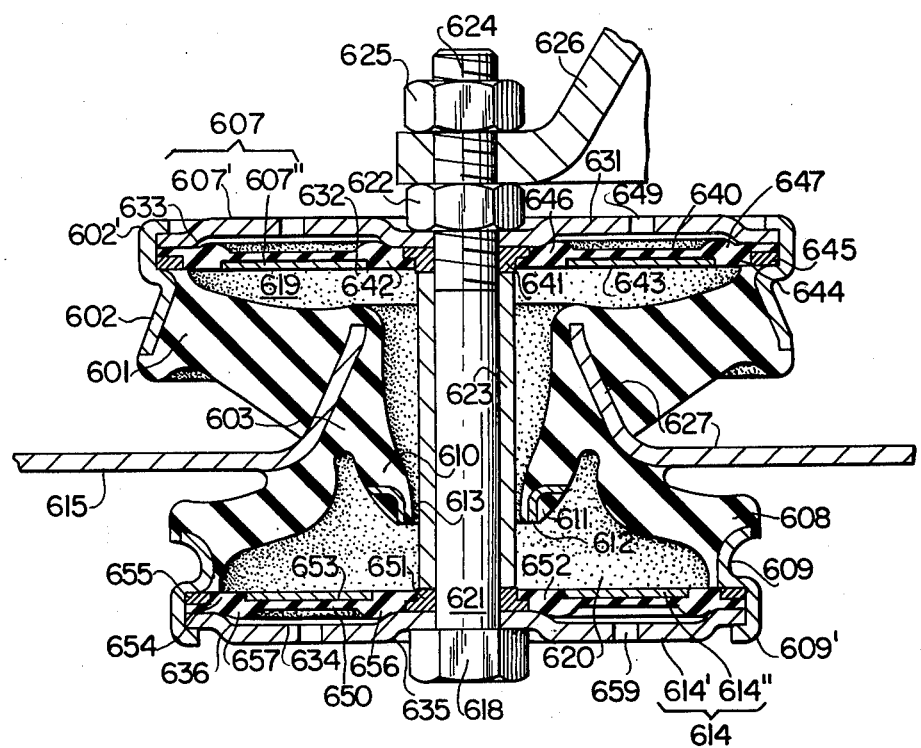
FIG. 6 shows a further engine mount incorporating double-walled end walls, with the end walls connected by a central bolt.

In the engine mount of FIG. 6, a rubber elastic peripheral wall 601 on the engine side is adheringly connected on its outer periphery with a metallic shell 602 and on its internal periphery with a conical surface 604. Shell 602 is fixed by means of a rim 602' on the outer wall 607' of a double-walled end wall 607 on the engine side, which element at the same time firmly and tightly clamps an inner wall 607" between shell 602 and outer wall 607'. Conical surface 604 and a flange 615 that is integral with it constitute a supporting element 627 which is to be thought of as fixed or fixable to a vehicle structure or supporting frame, in a way that is not illustrated. A rubber elastic peripheral wall 608 on the side away from the engine is adheringly joined on its outer periphery with a metallic shell 609 and on its inner periphery with supporting element 627. Shell 609 is fixed by means of a rim 609' on an outer wall 614' of a double-walled end wall 614 that is away from the engine, said element at the same time clamping an inner wall 614" firmly and tightly between shell 609 and outer wall 614'. A bolt 621 with a head 618 clamps front wall 614, a spacing tube 623 and front wall 607 by means of a nut 622, and thus rigidly connects the two walls 607 and 614. End wall 607 is fixed by means of an extension 624 of bolt 621 and a nut 625 to an engine casing or mounting bracket designated 626. A rubber elastic partition 603 is adheringly joined at its outer periphery with conical surface 604 of supporting element 627 and provided with a neck 610 directed toward the side away from the engine, said neck ending in a collar 611 that is reinforced by an angular metallic insert 612 and together with spacing tube 623 forms an annular gap 613.

A liquid chamber 619 on the engine side is limited by peripheral wall 601 and end wall 607 and divided off by partition 603 from a liquid chamber 620 on the side away from the engine, which chamber is defined by peripheral wall 608 and end wall 614. Liquid chambers 619 and 620 are interconnected via the annular gap 613 that acts as a choke opening. Collar 611 imposes a relatively slight resistance to transverse movements with reference to support element 627.

End wall 607 is made as a double wall with an intermediate chamber 640 that is vented to the outside through ports 649, and the construction is such that an annular groove-like depression 631, pressed into outer wall 607' and presenting conical transition surfaces 632 and 633, is covered by inner wall 607".

Inner wall 607" is a vulcanized rubber-metallic part and comprises an inner metallic ring 641 clamped between spacing tube 623 and outer wall 607', an inner rubber ring 642, a metallic annular plate 643, an outer rubber ring 644, and an outer metallic ring 645 clamped between shell 602 and outer wall 607', the said elements being disposed in annular arrangement from the inside outward. Rubber ring 642 presents an annular pad 646 that is applied to transition surface 633 and extends into the inner peripheral zone of annular plate 643. Rubber ring 644 has an annular pad 647 that extends into the outer peripheral zone of annular plate 643. The zone of annular plate 643 between annular pads 646 and 647 is covered with a thin rubber skin. End wall 614 is likewise double-walled and constructed in the same way as wall 607. The analogous parts are openings 659, an intermediate space 650, outer wall 614', transition surfaces 635 and 636, a depression 634, inner wall 614'', a metallic ring 651, an inner rubber ring 652, a metallic annular plate 653, an outer rubber ring 654, an outer metallic ring 655, an annular pad 656, and an annular pad 657.

In short stroke movements of the rigidly connected front walls 607 and 614 with reference to backup element 627, the volumes forced into respective liquid chambers 619 and 620 are taken up without any resistance worth mentioning, by the inward and outward movements of inner walls 607'' and 614'', whereby no pressure worth mentioning is built up in chambers 619 and 620 and consequently there is no exchange of liquid, or only an insignificant one, between chambers 619 and 620 through annular gap 613, hence no hydraulic damping of the movements.

With strokes of walls 607 and 614 that become greater, annular pads 646 and 647 or 656 and 657 are applied more and more to transition surfaces 632 and 633 or 635 and 636, whereby they oppose the shifting of inner walls 607'' and 614'' respectively with increasing resistance until finally inner walls 607'' and 614'' no longer yield and act as fixed walls. The spatial relationships are such that in this stroke-limited end position of walls 607'' and 614'' gaps remain between annular plates 643 and 653 respectively and outer walls 607' and 614' respectively, which gaps are vented through ports 649 and 659 respectively, whereby the possibility of unwanted suction adherence of walls 607'' or 614'' against walls 607' or 614' is excluded.

In an assumed movement of end wall 607 from the illustrated position (that might correspond to a medium position of the engine bearing) in the direction toward supporting element 627, the said movement considered to be static for the sake of simplicity, the reduction in volume of liquid chamber 619 is first balanced by the approach of wall 607'' to wall 607', whereby pressure is builtup increasingly in chamber 619, and at the same time by flow of liquid through annular gap 613 into liquid chamber 620, this latter occurring exclusively as soon as wall 607'' has reached the stroke-limited end position. The production of hydraulic damping force is increasingly associated with this process, the magnitude of the force, as known, being a function of the velocity of the absorbed long-stroke movement of wall 607 when wall 607'' reaches the stroke-limited end position. The increase in volume of liquid chamber 620 which occurs at the same time is balanced by the volume that has flowed from liquid chamber 619 and, insofar as this is insufficient, it is balanced by the yielding of wall 614'' away from wall 614', the elasticity of rubber rings 652 and 654 being made sufficient to prevent development of a vacuum and the associated unwanted formation of cavities or voids in the liquid. With dynamic long-stroke oscillations of the engine mount, there is alternating application of walls 607'' and 614'' on walls 607' and 614' or a yielding of walls 607'' and 614'' directed away from walls 607' and 614'.

Figure 7:
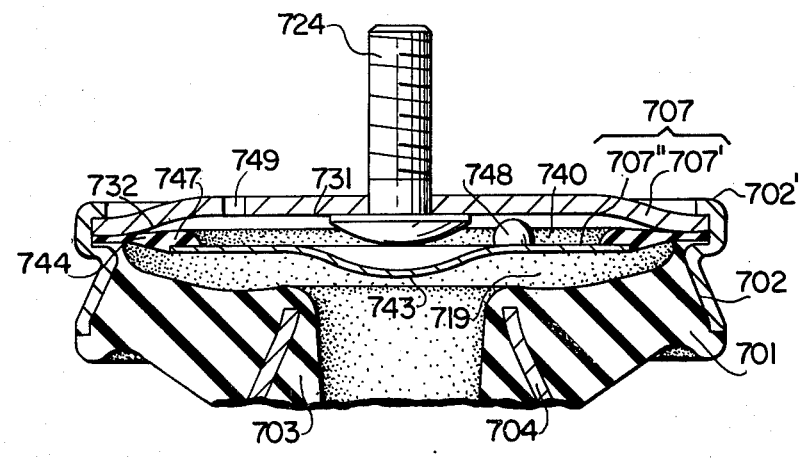
FIG. 7 is a partial view of an engine mount similar to FIG. 6, but having no internal connecting bolt.

In the engine mount of FIG. 7 a rubber elastic peripheral wall 701 on the engine side is adheringly joined at its outer periphery with a metallic shell 702 and at its inner periphery with a conical surface 704. Shell 702 is fixed by means of a rim 702' to an outer wall 707' of a front wall 707 on the engine side, which at the same time clamps an inner wall 707'' firmly and tightly between shell 702 and wall 707'. Conical surface 704 is part of a support element that is to be fixed to a motor frame, said element not being illustrated. End wall 707 has a bolt 724 which serves like bolt extension 624 of the engine bearing of FIG. 6 to fasten end wall 707 to an engine casing. A liquid chamber 719 on the engine side is limited by peripheral wall 701 and front wall 707 and divided off by a rubber partition 703 from a liquid chamber away from the engine, and not illustrated in the drawing. Said unillustrated liquid chamber is to be thought of as defined by a rubber elastic peripheral wall and by an end wall, both relatively away from the engine.

The rigid connection of the end wall that is away from the engine with end wall 707 may be effected by means of U-shaped retaining parts (not illustrated) whose arms are suitably connected firmly with the two end walls. The U-shaped parts may be direct parts of an engine casing. The end wall is made as a double wall, with an intermediate space 740 vented to the outside through port 749, in such a way that a depression 731 with a conical transition surface 732, pressed into outer wall 707', is covered by inner wall 707''. Wall 707'' is a vulcanized rubber-metallic part and comprises a metallic circular disc 743 and a rubber edge 744 that surrounds it, the outer periphery of said edge being clamped between shell 702 and wall 707'. Axial yielding of wall 707'' is effected by rubber edge 744. Rubber edge 744 has an annular pad 747 applied to transition surface 732 and extending into the outer periphery of circular disc 743. End wall 707 has the same functions as those indicated for walls 607 and 614 of the engine mount of FIG. 6. The resistance of wall 707'' in approaching wall 707' can be reinforced by supplementarily applied local elastic buttons 748 on circular plate 743.

Having thus described exemplary preferred embodiments of our invention, it is to be understood that these embodiments exemplify the invention, and do not necessarily limit it. The invention itself is as defined in the subjoined claims.

We claim:

1. An elastic rubber engine mount with hydraulic damping, especially for engine suspensions in motor vehicles, comprising a first metallic end wall for connection to an engine casing, a second metallic end wall spaced axially from said first wall, a metallic supporting element for connection to an engine supporting frame, a first elastic rubber-like peripheral wall adheringly connected with said first end wall and with said supporting element, a partition formed at least in major part of a flexible elastic rubber-like material and connected with said supporting element so as to define with said first end wall and said first peripheral wall a liquid-filled main chamber of variable volume on one side of said partition, a second elastic rubber-like peripheral wall adheringly connected with said second end wall and with said supporting element so as to define an auxiliary liquid-filler chamber of variable volume on the other side of said partition, means defining a flow connection between said main and auxiliary chambers, and means rigidly connecting said first and second end walls together for joint movement relative to said supporting element, at least one of said end walls including a truncated conical surface extending about the central longitudinal axis of the mount, said supporting element also including a truncated conical surface disposed generally across from and facing, but axially displaced relative to, the conical surface of said one end wall such that the two conical surfaces define therebetween a truncated conical space having generally concentric inner and outer truncated conical surfaces inclined in the same sense toward the central longitudinal axis of the mount, and at least one of said rubber-like peripheral walls comprising a similar truncated conical body having inner and outer axially displaced, truncated conical surfaces adheringly connected to the corresponding inner and outer axially displaced, truncated conical surfaces of said one end wall and said supporting element such that the inner and outer adhering surface areas are axially displaced relative to each other.

2. An engine mount as claimed in claim 1 wherein said first and second peripheral walls are disposed to function as thrust springs, and wherein the second peripheral wall is adheringly joined to an inwardly facing conical surface of said support element and to an outwardly facing conical surface of said second end wall.

3. An engine mount as claimed in claim 1 wherein said second peripheral wall is disposed and configured to function as a thrust spring and is adheringly joined to an inwardly facing conical surface of said second end wall and to an outwardly facing conical surface of said support element so as to oppose relative movement between said second end wall and said supporting element.

4. An engine mount as claimed in claim 1 wherein said second peripheral wall is adheringly joined to an inwardly facing surface of said second end wall and to an outwardly facing surface of a generally cylindrical sheath defining the flow connection between said chambers, and said partition is adheringly joined to an inwardly facing conical surface of said support element and to the outwardly facing surface of said sheath, said second peripheral wall and said partition being substantially integral.

5. An engine mount as claimed in claim 4 wherein said partition, upon impact with said second end wall, acts as a thrust spring on a pad formed in said second peripheral wall adjacent said sheath.

6. An engine mount as claimed in claim 1 wherein said means rigidly connecting said end walls comprises a bolt-like member passing through both end walls and an axial spacing tube between said end walls.

7. An engine mount as claimed in claim 6 wherein a gap between said axial spacing tube and said partition forms a choke opening comprising the flow connection between said chambers.

8. An engine mount as claimed in claim 6 wherein said flow connection between said chambers is formed between said bolt-like member and said spacing tube by grooves and openings.

9. An engine mount as claimed in claim 1 wherein said means rigidly connecting said end walls comprises an elongate member extending axially between said connecting walls, and wherein said partition of elastic rubber-like material is adheringly joined along an edge to said supporting element and extending inwardly therefrom to form a collar about said elongate member with an annular gap which functions as a choke opening and comprises said flow connection between said chambers.

10. An elastic rubber engine mount with hydraulic damping, especially for engine suspensions in motor vehicles, comprising a first metallic end wall for connection to an engine casing, a second metallic end wall spaced axially from said first wall, a metallic supporting element for connection to an engine supporting frame, a first elastic rubber-like peripheral wall adheringly connected with said first end wall and with said supporting element, a partition connected with said supporting element so as to define with said first end wall and said first peripheral wall a liquid-filled main chamber of variable volume on one side of said partition, a second elastic rubber-like peripheral wall adheringly connected with said second end wall and with said supporting element so as to define an auxiliary liquid-filled chamber of variable volume on the other side of said partition, means defining a flow connection between said main and auxiliary chambers, and means rigidly connecting said first and second end walls together for joint movement relative to said supporting element, wherein at least one of said end walls is of double-walled construction, comprising a fixed outer wall and an inner diaphragm-like yielding wall which is sealed with reference to the outer wall and comprises part of the wall of the associated liquid chamber, said inner wall being fixed by elastic rubber-like edges to said outer wall and bearing on said outer wall by means of elastic rubber-like projections so as to define an intermediate space between said inner and outer walls, the deformation resistance of said projections determining the yieldability of said inner wall.

11. An engine mount as claimed in claim 10 further comprising venting ports for venting said intermediate space to ambient.

12. An engine mount as claimed in claim 11 further comprising a concave depression in the inner surface of said outer wall, said inner wall covering said depression and comprising a rigid circular plate and a surrounding edge of elastic rubber-like material, the outer periphery of the elastic edge being secured by a rim on said outer wall, said rubber edge being provided with an annular pad that braces said circular plate relative to said outer wall.

13. An engine mount as claimed in claim 11 wherein a concave depression in the form of an annular groove is formed in the inner surface of said outer wall and is covered by said inner wall, said inner wall comprising an inner elastic ring, a rigid annular plate, and an outer elastic ring, the outer periphery of said inner wall being fixed by means of a rim on said outer wall, and the inner elastic ring being held on said outer wall by a bolt passing through said outer wall, said elastic rings including annular pads for bearing against said outer wall.

14. An elastic rubber engine mount with hydraulic damping, especially for engine suspensions in motor vehicles, comprising a first metallic end wall for connection to an engine casing, a second metallic end wall spaced axially from said first wall, a metallic supporting element for connection to an engine supporting frame, a first elastic rubber-like peripheral wall adheringly connected with said first end wall and with said supporting element, a partition connected with said supporting element so as to define with said first end wall and said first peripheral wall a liquid-filled main chamber of variable volume on one side of said partition, a second elastic rubber-like peripheral wall adheringly connected with said second end wall and with said supporting element so as to define an auxiliary liquid-filled chamber of variable volume on the other side of said partition, means defining a flow connection between said main and auxiliary chambers, means rigidly connecting said first and second end walls together for joint movement relative to said supporting element, at least one of said end walls including a truncated conical surface extending about the central longitudinal axis of the mount, said supporting element also including a truncated conical surface disposed generally across from and facing, but axially displaced relative to, the conical surface of said one end wall such that the two conical surfaces define therebetween a truncated conical space having generally concentric inner and outer truncated conical surfaces inclined in the same sense toward the central longitudinal axis of the mount, at least one of said rubber-like peripheral walls comprising a similar truncated conical body having inner and outer axially displaced, truncated conical surfaces adheringly connected to the corresponding inner and outer axially displaced, truncated conical surfaces of said one end wall and said supporting element such that the inner and outer adhering surface areas are axially displaced relative to each other, and a member of foamed cellular material disposed in at least one of said chambers for accommodating low amplitude oscillations without any appreciable hydraulic damping.

15. An engine mount as claimed in claim 11 wherein at least one of said end walls is coated with foamed cellular material.